US012736200B1

(12) United States Patent
Harris

(10) Patent No.: US 12,736,200 B1
(45) Date of Patent: Sep. 15, 2026

(54) CANDLE WARMING LAMP

(71) Applicant: Geoffrey Herbert Harris, Chicago, IL (US)

(72) Inventor: Geoffrey Herbert Harris, Chicago, IL (US)

(73) Assignee: Geoffrey Herbert Harris, Chicago, IL (US)

( * ) Notice: Subject to any disclaimer, the term of this patent is extended or adjusted under 35 U.S.C. 154(b) by 0 days.

(21) Appl. No.: 19/098,725

(22) Filed: Apr. 2, 2025

(51) Int. Cl.

| | |
|---|---|
| ***F21V 1/24*** | (2006.01) |
| ***F21V 1/20*** | (2006.01) |
| ***F21V 14/02*** | (2006.01) |
| ***F21V 14/04*** | (2006.01) |
| ***F21V 21/22*** | (2006.01) |
| ***F21V 23/04*** | (2006.01) |
| ***F21V 23/06*** | (2006.01) |
| ***F21V 35/00*** | (2006.01) |
| *F21Y 115/10* | (2016.01) |

(52) U.S. Cl.
CPC .................. *F21V 1/24* (2013.01); *F21V 1/20* (2013.01); *F21V 14/02* (2013.01); *F21V 14/04* (2013.01); *F21V 21/22* (2013.01); *F21V 23/0435* (2013.01); *F21V 23/06* (2013.01); *F21V 35/00* (2013.01); *F21Y 2115/10* (2016.08)

(58) Field of Classification Search
CPC ... F21V 1/24; F21V 1/20; F21V 14/02; F21V 14/04; F21V 21/22; F21V 23/0435; F21V 23/06; F21V 35/00; F21Y 2115/10
See application file for complete search history.

(56) References Cited

U.S. PATENT DOCUMENTS

| | | | | |
|---|---|---|---|---|
| 2,402,176 A * | 6/1946 | Marks | ...................... | F21S 6/002 359/488.01 |
| 2,902,592 A * | 9/1959 | Cole | ...................... | A47L 9/322 362/277 |
| 4,987,524 A * | 1/1991 | Miller | ...................... | F21V 13/10 362/361 |
| 12,253,254 B1 * | 3/2025 | Yi | ...................... | F21V 35/003 |
| 12,359,782 B1 * | 7/2025 | Liao | ...................... | F21S 6/001 |
| 2023/0366527 A1 * | 11/2023 | He | ...................... | F21V 23/001 |
| 2024/0066171 A1 * | 2/2024 | Yoo | ...................... | A61L 9/03 |
| 2024/0173450 A1 * | 5/2024 | Gong | ...................... | A61L 9/03 |

OTHER PUBLICATIONS

"Black Marble Candle Warmer," webpage <https://celestialathome.com/collections/home-accents/products/black-marble-candle-warmer>, 4 pages, Apr. 1, 2025.

* cited by examiner

*Primary Examiner* — Bao Q Truong
(74) *Attorney, Agent, or Firm* — Banner & Witcoff, Ltd.

(57) ABSTRACT

Apparatus and systems for a candle warming lamp that reduces an amount of electrical power required to cause a candle to emit a scent based on using reflected light are described herein. A base may be configured to receive at least one candle. A power source may be electrically coupled to a light source. A lamp shade may include a first portion at least partially enclosing the light source. The lamp shade may further include a second portion having an interior surface made of a reflective material. The second portion may reflect light emitted by the light source. The second portion may cause, based on reflecting the light, at least one candle to emit a scent.

20 Claims, 7 Drawing Sheets

CANDLE WARMING LAMP

TECHNICAL FIELD

Aspects described herein generally related methods and systems for warming candles using light emitting devices. More specifically, aspects relate to a lamp with a reflective element for warming candles with increased power efficiency.

BACKGROUND

The use of warming lamps to cause candles to emit a scent is known. Such lamps heat a candle to its melting point, producing a scent without producing flame or smoke in the manner of conventional wick-burning candles. However, conventional warming lamps are energy-inefficient. Battery-operated warming lamps may only have a battery life of 8 hours or less and require frequent battery replacement due to the amount of power required to heat a candle without flame. For example, a candle warming lamp utilizing a standard 12 V/35 W halogen bulb would expend the battery life of a 10,000 mAh battery (i.e., the equivalent to five standard AA-type batteries) in less than 3 hours. In these examples, the candle warming lamp would not have sufficient battery life for uses such as placing the lamp in, for example, a powder room or other location without convenient plug outlets. Conventional warming lamps utilize a wired electrical connection to plug directly into a power source, such as a wall outlet, but these require relatively high amounts of power to heat candles and may require frequent replacement of bulbs or other light sources that burn out from frequent use. The power inefficiencies in conventional warming lamps also increase costs (e.g., the costs of replacement batteries, replacement bulbs, and/or other costs). Accordingly, there exists a need for a candle warming lamp with improved power efficiency.

SUMMARY OF THE INVENTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to portable apparatuses and systems that reduce an amount of electrical power needed to cause a candle to emit a pleasant scent based on using reflected light.

One or more aspects described herein provide a candle warming lamp that includes a base configured to receive at least one candle. The candle warming lamp may include one or more power sources electrically coupled to a light source. The candle warming lamp may include a lamp shade. The lamp shade may include a first portion at least partially enclosing the light source. The lamp shade may include a reflector portion comprising a reflective material. The reflector portion may be configured to reflect light emitted by the light source and cause, based on reflecting the light, the at least one candle to emit a scent.

In one or more instances, the reflector portion may be configured to reduce, based on reflecting the light, an amount of power the one or more power sources produce prior to the at least one candle emitting the scent. In one or more arrangements, the candle warming lamp may include an extendable support apparatus coupled to the light source and to the base. In one or more instances, the extendable support apparatus may be configured to modify an amount of power the one or more power sources produce prior to the at least one candle emitting the scent by switching between a first position and a second position.

In one or more arrangements, the reflector portion may be coupled to the first portion. The reflector portion may extend, from the first portion, in a downward direction towards the base. In one or more instances, the reflector portion may include a portion of an interior surface of the lamp shade. In one or more arrangements, the reflector portion may include at least 90% of the interior surface of the lamp shade. In one or more instances, the reflector portion may include less than 50% of the interior surface of the lamp shade.

In one or more arrangements, the light source may include at least one light emitting diode (LED). In one or more instances, the light source may include a lightbulb. In one or more arrangements, the candle warming lamp may include a charging port electrically coupled to the one or more power sources. The candle warming lamp may include a control mechanism configured to modify one or more settings of the candle warming lamp.

In one or more arrangements, the reflective material may include a mirror. In one or more instances, the reflective material may include glass creating a prism-like effect in response to the light emitted by the light source contacting the reflective material. In one or more arrangements, the reflective material may include aluminum. In one or more instances, the reflective material may include a coating applied over the reflector portion. The coating may include one or more of: gold, silver, aluminum, and/or copper.

One or more additional or alternative embodiments described herein include a system for warming a candle. The system may include a light source. The system may include a shade enclosing the light source. The system may include a support apparatus coupled to the light source and to the shade. The support apparatus may be configured to maintain the shade a threshold distance above a base. The system may include a control mechanism configured to modify an intensity of light emitted by the light source. The shade may include a reflector portion configured to direct the light emitted by the light source towards the center of the base.

In one or more instances, the support apparatus may include an extendable portion configured to further modify an intensity of light received by the center of the base. In one or more arrangements, the reflector portion may include one or more of: an alloyed coating, a metal, and/or a glass. In one or more instances, the control mechanism may include a dial configure to be positioned between two or more settings. The control mechanism may be coupled to the light source via the support apparatus.

One or more additional or alternative embodiments described herein include a candle warming lamp. The candle warming lamp may include a base. The candle warming lamp may include a receptacle for receiving a light source. The candle warming lamp may include a support apparatus coupled to the base and to the receptacle. The candle warming lamp may include a shade configured to enclose the light source. The candle warming lamp may include a reflector extending from a bottom surface of the shade towards the base. The candle warming lamp may include a control mechanism mechanically coupled to the support apparatus and electrically coupled to the receptacle.

BRIEF DESCRIPTION OF DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed to portable apparatuses and systems that reduce an amount of electrical power needed to cause a candle to emit a scent based on using reflected light.

In the following description of the various embodiments, reference is made to the accompanying drawings, which illustrate various embodiments in which aspects described herein may be practiced. It is to be understood that other embodiments may be utilized and structural and functional modifications may be made without departing from the scope of the described aspects and embodiments. Like numbered elements in the accompanying drawings may perform the same or similar functions as described herein. Aspects of one or more of the example configurations depicted in the accompanying drawings may be combined without departing from the scope of this disclosure. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Figure 1A:
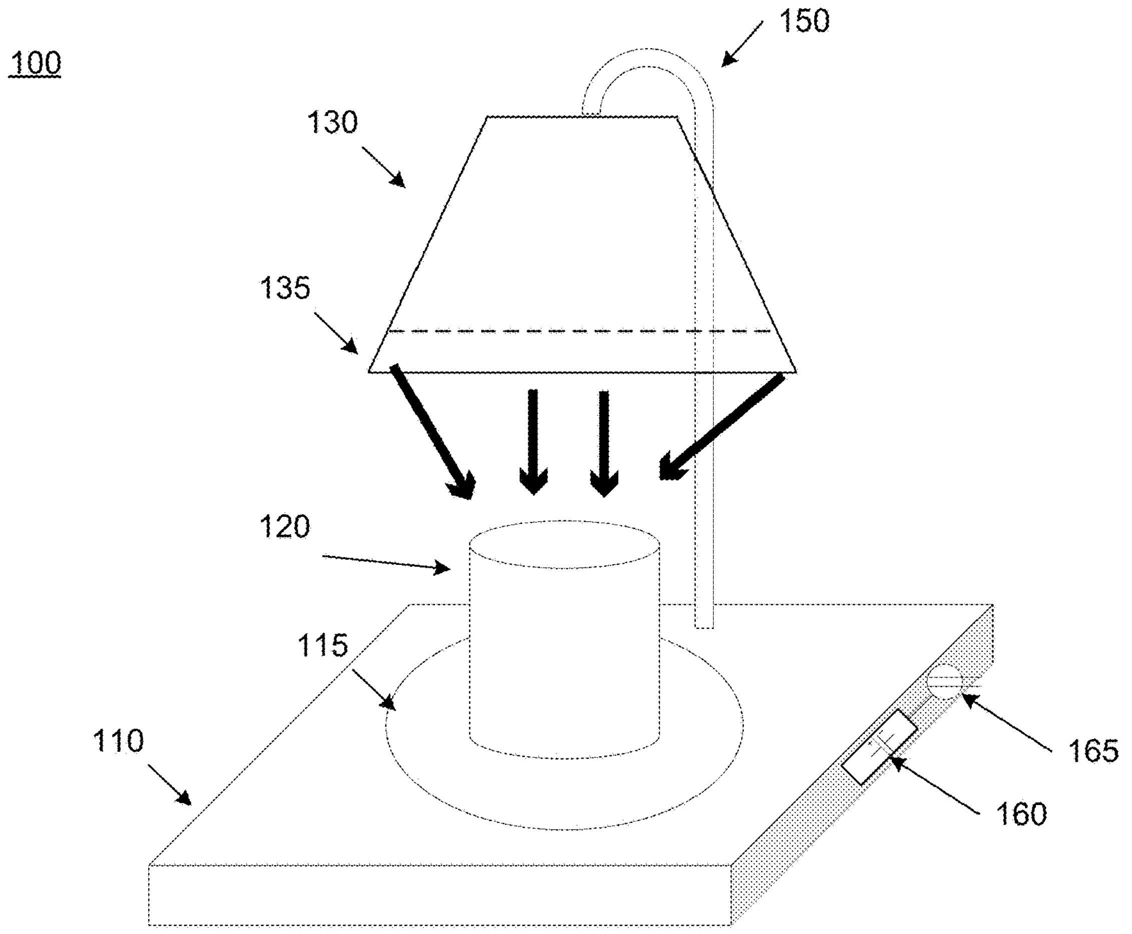
FIGS. 1A-1B are diagrams illustrating example configurations of a candle warming lamp that may be used to implement aspects of the disclosure.

FIG. 1A illustrates an example configuration of a candle warming lamp 100 that may be used to implement aspects of the disclosure. Components of the candle warming lamp 100 may be configured to cause a candle 120 to emit a scent without producing smoke or flame. Components of the candle warming lamp 100 may be configured to cause the candle 120 to emit the scent while conserving electrical energy/power by maximizing the efficiency of a light source used to warm the candle 120 and cause the candle 120 to emit the scent.

The candle warming lamp 100 may include a base 110. The base 110 may be configured to receive at least one candle 120. While a single candle 120 is shown for illustrative purposes, it should be understood that the base 110 may be configured to receive multiple candles of varying sizes. The base 110 may have a rectangular shape, a squared shape, a circular shape, and/or any other shape. The base 110 may, in some examples, have specific dimensions selected to allow the candle warming lamp 100 to be easily portable from one location to another. For example, in certain embodiments the base 110 may have a width between 4 and 12 inches, preferably 6 inches. Additionally or alternatively, the base 110 may have a length between 4 and 12 inches, preferably 6 inches. Additionally or alternatively, the base 110 may have a height between 0.5 and 1.5 inches, preferably 1 inch. It should be understood that the dimensions described above and that the base 110 may have additional or alternative dimensions without departing from the scope of this disclosure.

The base 110 may be made of any material, or combination of materials, capable of supporting at least one candle 120. For example, the base 110 may be made of a stone (e.g., marble, granite, and/or other stones), a metal (e.g., iron, aluminum, and/or other metals), an alloy (e.g., bronze, steel, and/or other alloys), a wood, a plastic, and/or any other solid material capable of supporting at least one candle 120. Any portion of the base 110 may be configured to receive at least one candle 120.

In some examples, the base 110 may include a placement region 115 specifically designed to receive at least one candle 120. In some examples, the placement region 115 may be constructed from the same material as the base 110. In these examples, the placement region 115 may be and/or include an outline, ridge, patterned region, and/or any other visual indicator of a demarcation between the placement region 115 and the remainder of the base 110. Also or alternatively, in some examples, the placement region 115 may have a different color from the base 110. For example, in certain embodiments the placement region 115 may have a darker color than the remainder of the base 110. In these examples, the darker color of the placement region 115 may be selected during design to enable the placement region 115 to absorb light to a greater degree than the remainder of the base 110. This may increase the speed at which a candle 120 placed on the placement region 115 is heated by the candle warming lamp by heating the candle from beneath as light is absorbed by the placement region 115, which in turn would reduce the amount of electrical energy/power needed to warm the candle 120 to a degree sufficient to produce a scent. Having a placement region 115 with a darker color than the remainder of the base 110 may also provide the benefit of preventing the remainder of the base 110 from becoming too hot to touch during the warming of the candle 120. Also or alternatively, in some examples, the placement region 115 may be constructed from a different material than the remainder of the base 110. In these examples, the placement region 115 may be constructed from a material with heat-absorbing properties. For example, the placement region 115 may be constructed from a particularly heat-absorbent stone while the remainder of the base 110 is constructed from a less heat-absorbent material, such as a wood or a particular metal. In this way, the placement region 115 may further increase the speed with which the candle 120 is warmed by the candle warming lamp 100 and as a result may reduce the amount of electrical energy/power required to cause the candle 120 to produce a scent.

The base 110 may include one or more power sources 160. As shown in the example configuration of FIG. 1A, the power sources 160 may be, and/or be located within, a port or other receptacle for a power source. For example, as shown in FIG. 1A, may be and/or include one or more internal power sources, such as a battery or batteries. For example, the one or more power sources 160 may be one or more batteries placed within a component of the candle warming lamp 100 (e.g., in the base 110) via a gap or other opening. The one or more power sources 160 may be electrically coupled to a light source of the candle warming lamp 100 to provide electrical energy/power to the light source. While FIG. 1A depicts the one or more power sources 160 on a side surface of the base 110, it should be understood that the one or more power sources 160 may be located at any portion of the candle warming lamp 100 configured to receive electrical energy/power, without departing from the scope of this disclosure. For example, as described above, the one or more power sources 160 may be batteries located within the base 110. The one or more power sources 160 may also be a, and/or be located within, a port or other receptacle positioned on a bottom surface of the base 110, on a top surface of the base 110, and/or at any other location on the base 110. In some examples, the one or more power sources 160 may be rechargeable. For example, the one or more power sources 160 may be rechargeable batteries coupled to an outlet 165 (e.g., a port, or the like) configured to receive a charging cable, wire, plug, or the like coupled to an external power source such as a wall outlet.

Figure 1B:
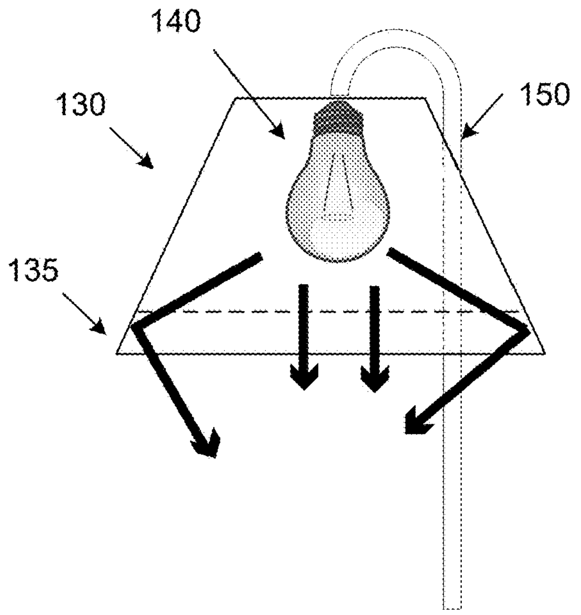

The candle warming lamp 100 may include a lamp shade 130. The lamp shade 130 may be suspended above the base 110 and/or the placement region 115 (e.g., by a support apparatus 150, as described herein). The lamp shade 130 may be configured to partially or fully enclose a light source of the candle warming lamp 100. For example, as illustrated in FIG. 1B (depicting a cross-sectional view of the lamp shade 130 of the candle warming lamp 100), the lamp shade 130 may enclose a light source such as light source 140.

The light source 140 may be any light source configured to produce sufficient light (and sufficient corresponding heat) to melt a candle 120 and cause the candle 120 to emit a scent. The light source 140 may be electrically coupled to the power sources 160. The light source 140 may, as a result of receiving electrical energy/power from the power sources 160, emit the light. In some examples, the light source 140 may be a lightbulb.

In some examples, the light source 140 may be an LED or LED bulb. For example, the light source 140 may be an LED such as a miniature, low-current, low-power, standard, ultra-high-output, high-power, AC driven, flashing, bi-color, tri-color, decorative-multicolor, or filament LED depending on the embodiment. The light source 140 may be an LED that includes one or more solid-state semiconductor devices configured to convert electricity into specific wavelengths of light. The light source 140 may be made of any of a number of semiconductor materials including gallium arsenide, aluminum gallium arsenide, gallium arsenide phosphide, aluminum gallium indium phosphide, gallium (III) phosphide, aluminum gallium phosphide, indium gallium nitride, gallium (III) nitride, zinc selenide, silicon carbide, silicon, diamond, boron nitride, aluminum nitride, aluminum gallium nitride, aluminum gallium indium nitride, gallium indium nitride, and the like. Such semiconductor materials may be used alone, or in combination. The light source 140 may be configured to emit wavelengths of light corresponding to ambient colors (e.g., warm white light) and/or other colors (e.g., orange, yellow, blue, pink, red).

Alternatively, the light source 140 may be an incandescent lightbulb, a fluorescent lightbulb, and/or other lightbulbs. The light source 140 may be selected to utilize a specific wattage (e.g., to further improve the energy efficiency of the candle warming lamp 100 as described herein). For example, the light source 140 may be configured to use between 8 and 100 watts, preferably between 8 and 60 watts.

While FIG. 1B depicts a single light source 140, it should be understood that the candle warming lamp 100 may include multiple such light sources. For example, the light source 140 may be or include a plurality of lightbulbs and/or a plurality of LEDs or LED bulbs without departing from the scope of this disclosure. In some examples, each light source 140 may be separately controllable by a control mechanism as described further herein. For example, the candle warming lamp may be controlled by the controlled mechanism such that each light source 140 switches between an on state and an off state depending on whether the candle warming lamp 100 is being operated in a setting that corresponds to the particular light source 140. Each light source 140 may be affixed to a top portion of the support apparatus 150 and/or otherwise integrated into the lamp shade 130 (e.g., so as to enable the emission of light as shown in FIGS. 1A-1B).

Although not depicted, in some examples the lamp shade 130 and/or the support apparatus 150 may include a hook or other mechanism that may configure the light source 140 to be hung from and/or otherwise attached to the lamp shade 130 and/or the support apparatus 150. Additionally or alternatively, the lamp shade 130 and/or the support apparatus 150 may include a threaded element for receiving a corresponding element of the light source 140 (e.g., to attach the light source 140 to the lamp shade 130 and/or the support apparatus 150 via a twisting or screwing motion).

The lamp shade 130 may be configured to at least partially enclose the light source 140 in such a manner as to direct light emitted by the light source 140 in a specific direction. For example, while the light source 140 may emit light radially outward from some or all of its surface, the lamp shade 130 may be configured to limit or prevent light from emitting beyond the lamp shade 130 in specific directions. As depicted in FIGS. 1A, and 1B, the lamp shade 130 may be configured such that light emitted by the light source 140 exits the region enclosed by the lamp shade 130 only in a downward direction towards the base 110. In some examples, the lamp shade 130 may be configured or shaped such that the light emitted by the light source 140 is directed only towards a specific portion of the base 110. For example, referring again to FIG. 1A, the lamp shade 130 may have a conical or circular shape that matches the shape of the placement region 115 and causes light emitted by the light source 140 to exit the lamp shade 130 only in a direction towards the placement region 115.

At least a portion of the lamp shade 130 may be made of plastic, metal, an alloy, canvas, or any combination thereof. For example, a portion of the lamp shade 130 may be made of a material that is semi-opaque, allowing some amount of light emitted by the light source 140 to exit the lamp shade 130 in a direction other than downward (e.g., to provide ambient lighting to a room or other location of the candle warming lamp 100). In some examples, the lamp shade 130 may be made entirely of opaque materials that prevent any light emitted by the light source 140 from exiting the lamp shade 130 in a direction other than downward through an opening of the lamp shade 130.

In order to improve the energy efficiency of the candle warming lamp 100, at least a portion of the lamp shade 130 may be a reflector 135. The reflector 135 may be made of a reflective material configured to reflect a threshold amount of light emitted by the light source 140. For example, the reflector 135 may be configured to reflect a threshold amount of light emitted by the light source 140 in a direction other than towards the base 110 such that the light is instead directed towards the base 110. In this way, a greater amount of the total light emitted by the light source 140 is directed towards the base 110 and any candle 120 placed upon the base 110 and under the lamp shade 130. By reflecting light that would not otherwise reach the candle 120, the reflector 135 improves the energy efficiency of the candle warming lamp 100 by reducing or eliminating otherwise wasted light production and increasing the speed with which the candle 120 may be warmed to a degree sufficient to produce a scent. This reduces the amount of time, and consequently the amount of electrical energy/power produced by the support apparatus 150, needed to cause the candle 120 to produce the scent.

Figure 2A:
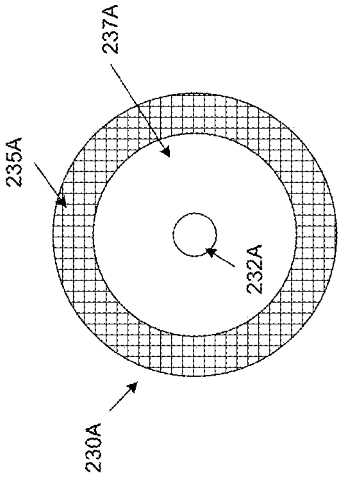
FIGS. 2A-2C are cross-sectional diagrams illustrating a bottom view of configurations of a reflector that may be included within a shade of a candle warming lamp according to one or more aspects of the disclosure.
Figure 2B:
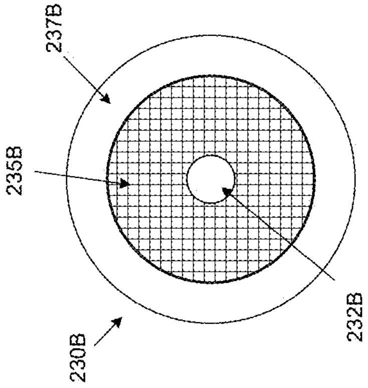
Figure 2C:
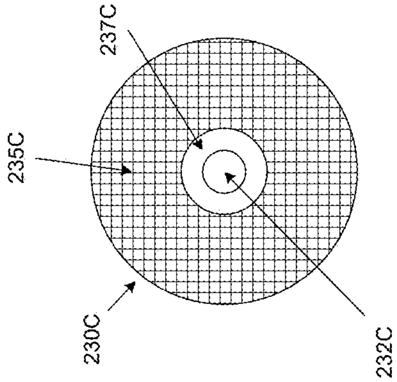

In some examples, the reflector 135 portion of the lamp shade 130 may be or include a portion of an interior surface of the lamp shade 130. For example, as illustrated in FIG. 1A by the dotted line depicting reflector 135, the reflector 135 may be positioned only within the interior of the lamp shade 130. FIGS. 2A-2C are cross-sectional diagrams illustrating a bottom view of configurations of a reflector 135 that may be included within a shade of a candle warming lamp according to one or more aspects of the disclosure. Referring to FIGS. 2A-2C, from a bottom view (i.e., facing into a bottom portion/opening of a lamp shade 230A/230B/230C from which light emitted by the light source 140 is directed towards the base 110) of the lamp shade 230A/230B/230C (e.g., a lamp shade 230A/230B/230C having a circular or conical shape), the lamp shade 230A/230B/230C may include a receptacle component 232A/232B/232C. The receptacle component 232A/232B/232C may be a hook, threaded element, and/or any other receptacle for the light source 140 to be placed within the confines of the lamp shade 230A/230B/230C. The lamp shade 230A/230B/230C may include a reflector 235A/235B/235C and a nonreflective region 237A/237B/237C. The nonreflective region 237A/237B/237C may be made of any material, such as a plastic, metal, an alloy, canvas, or any combination thereof. For example, the nonreflective region 237A/237B/237C may be made of a material that is semi-opaque, allowing some amount of light emitted by the light source 140 to exit the lamp shade 230A/230B/230C in a direction other than downward (e.g., to provide ambient lighting to a room or other location of the candle warming lamp 100). In some examples, the nonreflective region 237A/237B/237C may be made entirely of opaque materials that prevent any light emitted by the light source 140 from exiting the lamp shade 230A/230B/230C in a direction towards the nonreflective region 237A/237B/237C.

In some examples, the reflector 235A/235B/235C may extend from a base/lower edge of the interior of the lamp shade 230A/230B/230C (i.e., an edge of the lamp shade 230A/230B/230C closest to the base 110 of the candle warming lamp 100) upwards or towards the receptacle component 232A/232B/232C. For example, referring to FIG. 2A, the reflector 235A portion of the interior of the lamp shade 230 may begin at the base/lower edge of the lamp shade 230A and extend, towards the receptacle component 232A, a particular distance. The remainder of the interior of the lamp shade 230A may include the nonreflective region 237A. Additionally or alternatively, In some examples the reflector 235A/235B/235C may extend from a top/upper edge of the interior of the lamp shade 230A/230B/230C (e.g., from point at which the lamp shade 230A/230B/230C is coupled to the support apparatus 150 and/or to the light source 140) downwards or away from the receptacle component 232A/232B/232C (i.e., towards the opening in the lamp shade 230A/230B/230C facing the base 110). For example, referring to FIG. 2B, the reflector 235B portion of the interior of the lamp shade 230B may begin at a point where the lamp shade 230B is coupled to the support apparatus 150 and/or to the light source 140 and extend downwards or away from the receptacle component 232B towards the base 110. The remainder of the interior of the lamp shade 230B may include the nonreflective region 237B. The shape of the lamp shade 230A/230B/230C may be configured to contribute to the energy efficiency of the candle warming lamp 100. For example, as depicted in FIGS. 2A-2C, the lamp shade 230A/230B/230C may be shaped such that an opening at the bottom of the lamp shade 230A/230B/230C (i.e., an opening closest to the base 110) has a circular or near-circular shape. As depicted in FIGS. 1A-1C, the lamp shade 130 may have a circular opening as described above and a conical shape extending from the opening upward towards the light source 140. These and other shapes may be configured to direct light reflected by the reflector 235A/235B/235C downward and towards the base 110 and/or the placement region 115. For example, as described herein, a lamp shade 130 may have an opening matching the shape of the placement region 115 such that the light emitted by the light source 140 and/or reflected by the reflector 235A/235B/235C is directed singularly or primarily towards the placement region 115, maximizing the amount of light that reaches the candle 120.

The position of the reflector 235A/235B/235C may be configured to optimize the amount of light reflected by the reflector 235A/235B/235C. For example, depending on the shape of the light source 140, a configuration of the reflector 235A as depicted in FIG. 2A may reflect more light than a configuration of the reflector 235B as depicted in FIG. 2B. Alternatively, in some examples, a configuration of the reflector 235A as depicted in FIG. 2A may reflect less light than a configuration of the reflector 235B as depicted in FIG. 2B. The reflector 235A/235B may be or include a contiguous portion of the interior of the lamp shade 230A/230B, as shown in FIGS. 2A-2B. Although not shown, it should be understood that the reflector 235A/235B/235C may also be or include one or more separate portions of the interior of the lamp shade 230A/230B/230C without departing from the scope of this disclosure. For example, the reflector 235A/235B/235C may be or include two or more bands or patches of reflective material located within the interior portion of the reflector 235A/235B/235C.

The reflector 235A/235B/235C may make up a threshold amount of the interior surface of the lamp shade 230A/230B/230C. In some examples, the threshold amount may be an amount configured to maximize the amount of light reflected by the reflector 235A/235B/235C away from the interior surface of the lamp shade 230A/230B/230C and towards the base 110. For example, as shown in FIG. 2C, the reflector 235C may be and/or cover at least 90% of the interior surface of the lamp shade 230C. In some examples, the threshold amount may be an amount required to minimize the amount of reflective material required while still enabling the candle warming lamp 100 to cause a candle 120 to emit a scent with reduced electrical energy/power consumption relative to conventional warming lamps. In these examples, the candle warming lamp 100 may reduce the total material costs required to construct the lamp and/or may optimize the amount of light reflected by the reflector 235A/235B/235C such that a candle 120 does not melt at a rate faster than desired for a user of the candle warming lamp 100 to be able to enjoy the scent produced by the candle 120. For example, the threshold amount may be 50% or less of the interior surface of the lamp shade 230A/230B/230C. It should be understood that the thresholds described herein are merely examples and that the reflector 235A/235B/235C may include and/or cover different amounts of the interior surface of the lamp shade 230A/230B/230C without departing from the scope of this disclosure.

The reflector 235A/235B/235C may be made of any reflective material having, or producing, a threshold amount of reflectivity. The threshold amount of reflectively may be determined during design of the candle warming lamp 100. The threshold amount of reflectivity may be an amount sufficient to melt one or more specific types of candles 120 within a threshold amount of time. In some examples, the threshold amount of reflectivity may be at least 90%. In certain embodiments, the threshold amount of reflectivity may be at least 95%. In some examples, the threshold amount of reflectivity may be at least 99.9% and up to 99.999%.

In some examples, the reflective material may be a mirror. For example, the reflective material may be a metal, such as gold, aluminum, silver, copper, or any combination thereof that reflects light emitted by the light source 140. For example, the reflective material may be an alloy of different reflective metals. In some examples, the reflective material may be selected to optimize the level of reflectivity of the reflector 235A/235B/235C. For example, the reflective material may be a metal (e.g., silver, or aluminum) with a reflectivity between 90% and 95% to prevent the light reflected towards the base 110 from melting the candle 120 too quickly. Alternatively, in some examples, the reflective material may be a dielectric mirror with a reflectivity of nearly 100% (e.g., 99.999%) to maximize the amount of light reflected towards the base 110.

In some examples, the reflector 235A/235B/235C may be or include a reflective material, such as glass, configured to create a prism-like effect in response to the light emitted by the light source 140 contacting the reflective material. For example, the reflector 235A/235B/235C may be or include one or more pieces of glass positioned around a perimeter of the interior of the lamp shade 230A/230B/230C such that light emitted by the light source 140 is refracted through the reflector 235A/235B/235C and towards the base 110. In some examples, creating a prism-like effect may also allow light from other light sources that enters the lamp shade 230A/230B/230C (e.g., through one or more additional openings in the lamp shade 230A/230B/230C) to be directed towards the base 110, further reducing the amount of energy/power required to cause the candle 120 to emit a scent.

In some examples, the reflector 235A/235B/235C may be constructed entirely from the reflective material. In some examples, the reflector 235A/235B/235C may include the reflective material only on an interior surface of the lamp shade 230A/230B/230C. For example, the reflector 235A/235B/235C may be made of a first material (e.g., wood, metal, plastic, or the like) that is coated, on a surface facing the interior of the lamp shade 230A/230B/230C, with a reflective material. For example, the reflective material may be a reflective coating such as a reflective paint, a metal coating (e.g., a gold coating, silver coating, aluminum coating, copper coating, or the like), a glass coating, a chemical coating, a polyester film, and/or other reflective coatings.

In some examples, the reflector 235A/235B/235C may include both an interior portion and an exterior portion of the lamp shade 230A/230B/230C. In these examples, the reflector 235A/235B/235C may be a separate component that is mechanically coupled to the lamp shade 230A/230B/230C. For example, referring to FIG. 4, which depicts another example embodiment of the candle warming lamp where like number elements perform the same or similar functions, a candle warming lamp 400 may include a lamp shade 430 and a reflector 435 mechanically coupled (e.g., sealed, glued, and/or otherwise coupled) to a bottom portion of the lamp shade 430 closest to the base 410. In these examples, the reflector 435 may extend, from the bottom portion of the lamp shade 430, in a downward direction towards the base. A reflector 435 extending downward from the lamp shade 430 as described herein may provide additional benefits. For instance, in the example where the reflector 435 is made of a glass or other refractive substance, the reflector 435 may refract ambient lighting from the room or other location of the candle warming lamp in a direction towards the candle based on the prism-like qualities of the substance.

Figure 4:
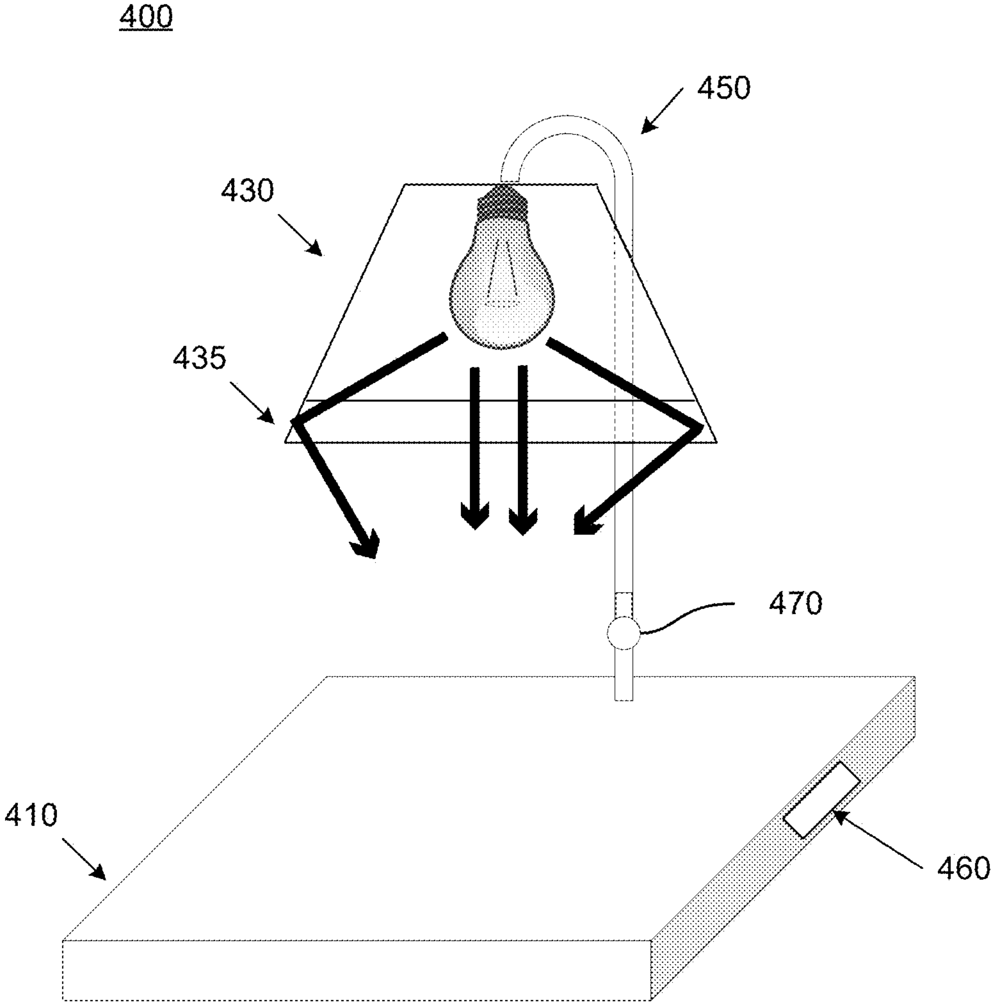
FIG. 4 is a diagram illustrating an additional example of a candle warming lamp that may be used to implement aspects of the disclosure.
Figure 6:
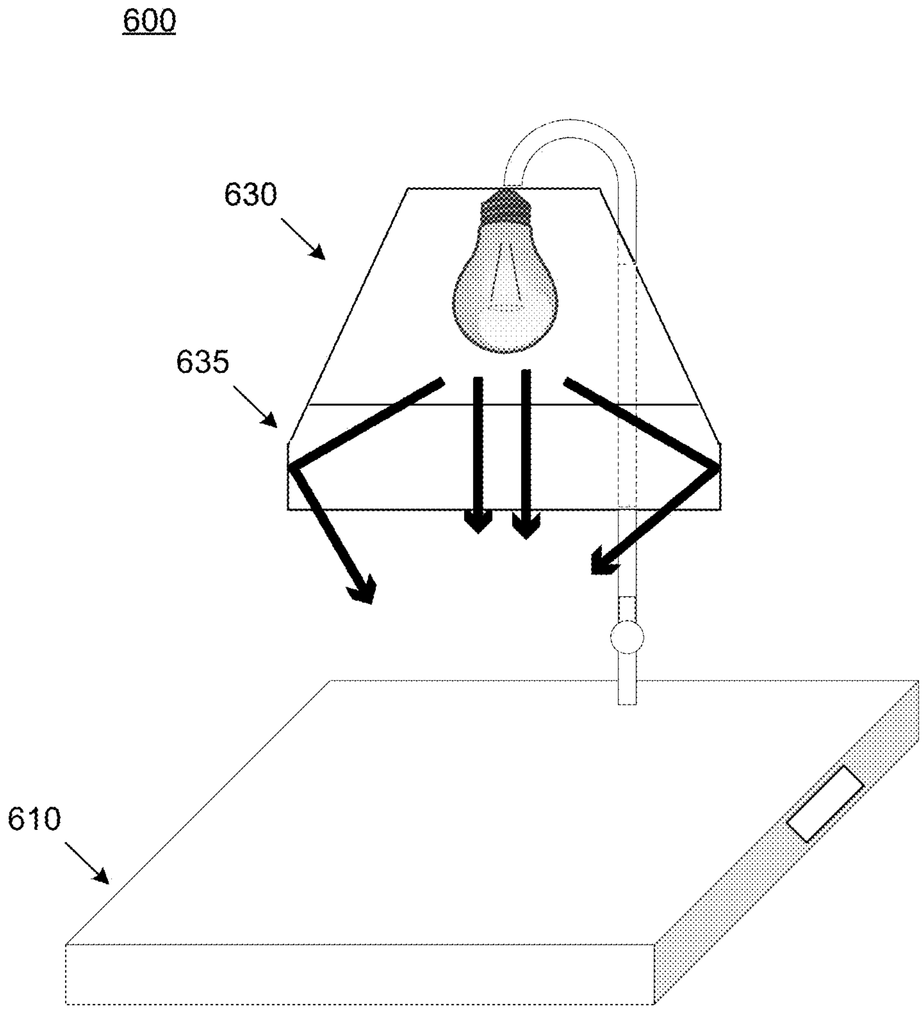
FIG. 6 is a diagram illustrating an example of a candle warming lamp with a different profile of a shade of the candle warming lamp according to one or more aspects of this disclosure.

Although depicted with an angled profile (relative to a hypothetical vertical axis) in FIG. 4, it should be understood that the lamp shade and the reflector of the candle warming lamp as described herein may have any one of a number of different profiles/shapes. For example, as shown in FIG. 6, the candle warming lamp 600 may have a lamp shade 630 with a variable profile. Lamp shade 630 has an angled profile at an upper portion but changes to a vertical profile at a lower portion. The lower portion includes the reflector 635. In some examples, the profile of the lamp shade 630 and/or of the reflector 635 may be selected to optimize an amount of light reflected by reflector 635 towards the center of base 610. For example, the lamp shade 630 and/or the reflector 635 may be configured with different profiles to modify the angle at which light is reflected by the reflector 635.

Referring again to FIG. 1A, the candle warming lamp 100 may include a support apparatus 150. The support apparatus 150 may be made of plastic, metal, wood, and/or any other solid material capable of supporting the lamp shade 130. In some examples, the support apparatus 150 may be configured as a rigid body offering minimal pliability. In some instances, the support apparatus 150 may alternatively be a semi-rigid and/or otherwise flexible structure that may, e.g., allow for positioning and/or orientation of the lamp shade 130 to be easily adjusted. The support apparatus 150 may have a variety of shapes. In some examples, the support apparatus 150 may have a hooked or arching shape (e.g., as shown in FIGS. 1A-1B). In some instances, the support apparatus 150 may alternatively have a straight shape, a segmented shape, and/or other shapes. The support apparatus 150 may include a hook, threaded portion, or other means of connecting the light source 140 and/or the lamp shade 130 to the support apparatus 150 at one end. The support apparatus 150 may, at a second end, be mounted to the top of the base 110, attached to a side of the base 110, and/or otherwise coupled to the base 110. Although shown having a single connection point with the base 110 and to the lamp shade 130 in FIG. 1A, it should be understood that that the support apparatus 150 may have one or more additional connection points with the lamp shade 130 (e.g., hooks, threaded portions, or the like) and/or one or more additional connection points (e.g., legs, feet, columns, or the like) with the base 110) without departing from the scope of this disclosure.

Figure 3:
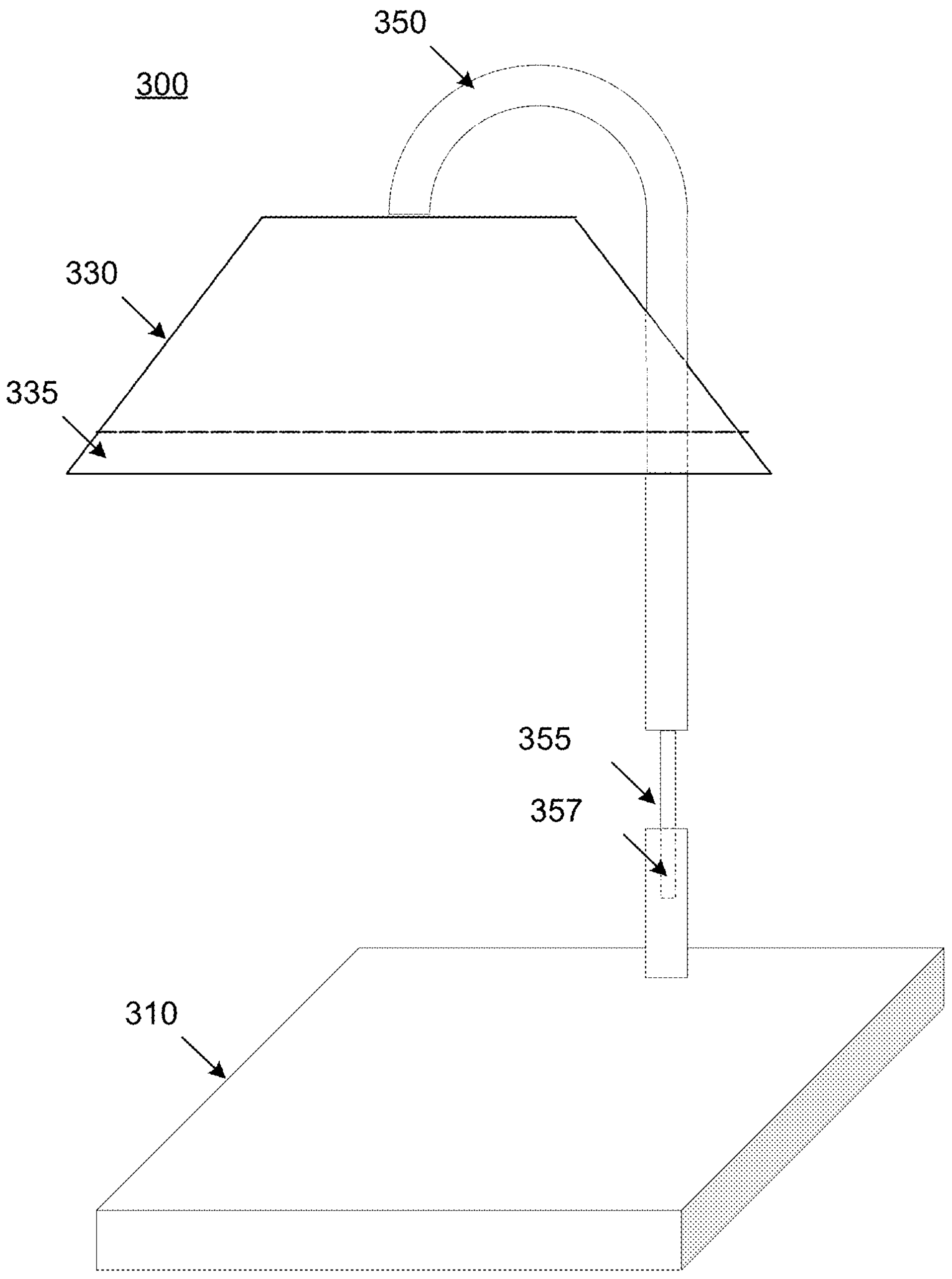
FIG. 3 is a diagram illustrating an extendable support apparatus for a candle warming lamp according to one or more aspects of the disclosure.

In some examples, the support apparatus 150 may include a height adjustment mechanism. FIG. 3 illustrates an extendable support apparatus with such a height adjustment mechanism for a candle warming lamp 300 according to one or more aspects of the disclosure. The candle warming lamp 300 may be similar to the candle warming lamp 100. For example, the candle warming lamp 300 may include a base 310, a lamp shade 330, a reflector 335, a support apparatus 350, and/or other counterpart components to those described herein with respect to the candle warming lamp 100. The support apparatus 350 may also include an extendable portion 355. The extendable portion 355 may be or include a second support apparatus configured to recede within the support apparatus 350. The extendable portion 355 may be used to extend and/or otherwise adjust a height of the lamp shade 330 and, consequently, to adjust a height of a light source within the lamp shade 330. In this way, the extendable portion 355 may allow the candle warming lamp 300 to increase or decrease the speed with which a candle placed on the base 310 is caused to produce a scent. For example, the extendable portion 355 may be extended or retracted to increase or decrease the amount of light that is reflected by the reflector 335 towards the candle. This may allow for finer control over the candle warming lamp 300 than is offered by conventional warming lamps and may also contribute to the improved energy efficiency of a candle warming lamp as described herein by allowing the light source of the candle warming lamp 300 to be adjusted to an optimal height for causing a candle to emit a scent while conserving electrical energy/power. For example, the support apparatus 350 may be configured to modify (e.g., minimize) an amount of power produced by one or more power sources (e.g., power sources 160) prior to a candle emitting the scent by transitioning between two or more positions. The support apparatus 350 and the extendable portion 355 may be configured to adjust the height of the lamp shade 330 between, for example, a height of 5 inches and a height of 20 inches (preferably between 6 and 13 inches). It should be understood that the lamp shade 330 may be adjusted between other heights without departing from the scope of this disclosure.

The support apparatus 350 may also include an extension mechanism 357. The extension mechanism 357 may be or include a mechanism for causing the extendable portion 355 to extend out of and/or recede into a portion of the support apparatus 350. In some examples, the extension mechanism 357 may be a threaded extension mechanism. For example, the extension mechanism 357 may be a threaded portion of the extendable portion 355 configured to screw into a threaded interior portion of the support apparatus 350. In some examples, the extension mechanism 357 may be a piston or spring mechanism configured to extend the extendable portion 355 out of the support apparatus 350 (raising the height of the lamp shade 330) in response to an unlocking of some locking mechanism (not shown) holding the extension mechanism 357 in position. It should be understood that these examples of an extension mechanism 357 are merely illustrative and that any mechanism suitable for extending or retracting a portion of the support apparatus 350 may be used without departing from the scope of this disclosure.

In some examples, a candle warming lamp as described herein may include a control mechanism. The control mechanism may be configured to modify one or more settings of the candle warming lamp. FIG. 4 illustrates an example embodiment of a candle warming lamp 400 that includes a control mechanism 470. The candle warming lamp 400 may include a base 410, a lamp shade 430, a reflector 435, a support apparatus 450, a power sources 460, and/or other components. The control mechanism 470 may be electrically coupled to a light source (not shown), such as light source 140 as described herein. The control mechanism 470 may be configured to modify one or more settings of the candle warming lamp 400 (e.g., to improve the energy efficiency of the candle warming lamp 400). In some examples, the control mechanism 470 may be a dial, switch, button, slider, or the like. The control mechanism 470 may modify the one or more settings by activating, deactivating, and/or toggling between each setting. The one or more settings may include an on setting (e.g., providing a flow of electrical energy/power to the light source), and off setting (e.g., preventing the flow of electrical energy/power to the light source), a color setting, a dimness/intensity setting, and/or other settings. Though not shown, it should be understood that the control mechanism 470 may include one or more electrical components configured to allow the control mechanism 470 to modify the settings. For example, the control mechanism 470 may be or include a variable resistance component (such as a potentiometer, or other component) positioned between a power source (e.g., power sources 460) and the light source. In these instances, varying the resistance of the variable resistance component may enable toggling between different settings. For example, to transition to a setting of higher intensity, the resistance may be decreased (e.g., by manipulating the control mechanism 470). Similarly, to transition to a setting of lower intensity, the resistance may be increased.

In some examples, the control mechanism 470 may be mechanically coupled directly to a portion of the candle warming lamp 400. For example, as depicted in FIG. 4, the control mechanism 470 may be mechanically coupled to the support apparatus 450. The control mechanism 470 may be coupled to the base 410 and/or any other portion of the candle warming lamp 400. Additionally or alternatively, in some examples, the control mechanism 470 may be electrically coupled to the candle warming lamp 400 but might not be directly mechanically coupled to the candle warming lamp 400.

Figure 5:
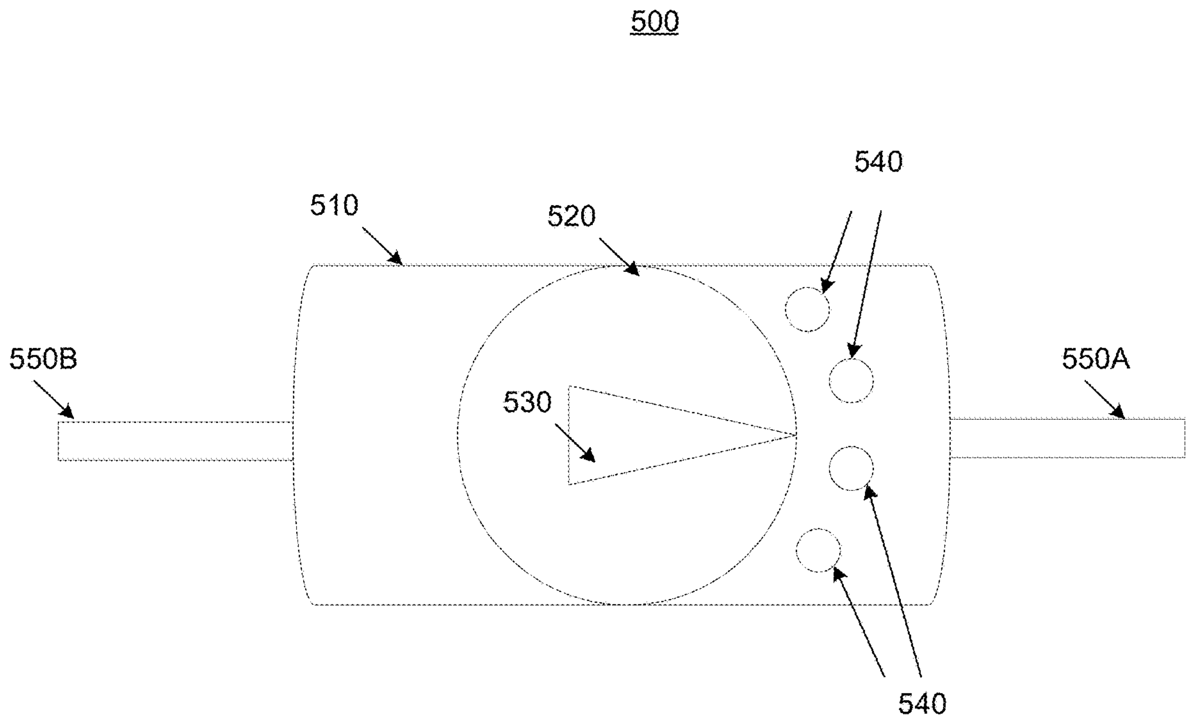
FIG. 5 is a diagram illustrating a control mechanism for a candle warming lamp according to one or more aspects of the disclosure.

FIG. 5 illustrates an example control mechanism 500 for a candle warming lamp as described herein. In some examples, the control mechanism 500 may be directly mechanically coupled to the candle warming lamp (e.g., as depicted in FIG. 4). Alternatively, in some examples, the control mechanism 500 may include one or more coupling components 550. The one or more coupling components 550 may be or include wires, cables, cords, or the like. For example, as shown in FIG. 5, the control mechanism 500 may include a first coupling component 550A (that may, for example, couple the control mechanism 500 to a candle warming lamp) and a second coupling component 550B (that may, for example, couple the control mechanism 500 to an external power source, such as a wall outlet or the like). Alternatively, in certain examples, the control mechanism 500 may be a remote control mechanism. For example, the control mechanism may be a wireless remote control mechanism configured to send one or more signals to a receiving component (not shown) of the candle warming lamp. The signals may configure the candle warming lamp to alternate between an on state and an off state, modify the intensity of light emitted by the candle warming lamp, and/or otherwise control the operation of the candle warming lamp as described herein.

The control mechanism 500 may have the same or substantially the same functionality as the control mechanism 470 described herein. For example, the control mechanism 500 may be configured to transition a candle warming lamp between a plurality of settings. The control mechanism 500 may include a toggle (e.g., a switch, slider, button, knob, dial, and/or other toggles) configured to transition the candle warming lamp between settings. For example, the toggle may be or include a toggle 520 that is a dial or knob configured to be twisted by a user. In some examples, the toggle 520 may include a selection indicator 530. The selection indicator 530 may be a marking, arrow, shape, pointer, and/or any other means of indicating which setting will be selected upon manipulation of the toggle 520. The control mechanism 500 may further include one or more setting indicators 540. The setting indicators 540 may be dots, icons, words, buttons, lights, notches, and/or any other indicators of what setting will be activated for the candle warming lamp upon manipulation of the toggle 520.

The control mechanism 500 may include a casing or body 510 that includes a number of electrical components, such as a variable resistance component (such as a potentiometer, or other component) positioned between a power source (e.g., power sources 460) and the light source. In these instances, varying the resistance of the variable resistance component may enable toggling between different settings. For example, to transition to a setting of higher intensity, the resistance may be decreased (e.g., by manipulating the toggle). Similarly, to transition to a setting of lower intensity, the resistance may be increased. The casing or body 510 may further include electrical components (e.g., switches, transistors, or the like) that are coupled to selection indicator 530 and/or to setting indicators 540 to send and receive signals that cause the transitions between settings based on manipulation of the toggle 520.

Figure 7:
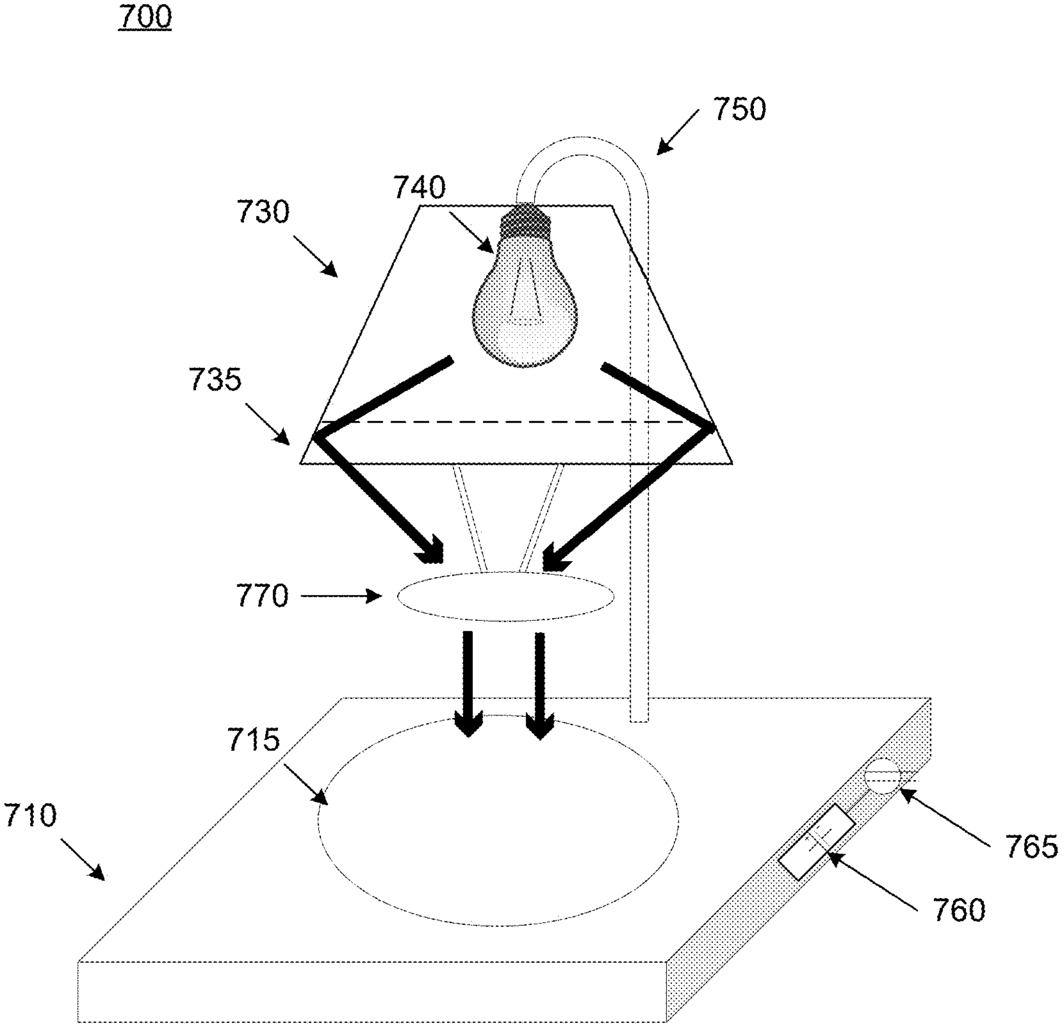
FIG. 7 is a diagram illustrating an example of a candle warming lamp with a focusing lens according to one or more aspects of this disclosure.

In some examples, a candle warming lamp as described herein may utilize one or more focusing lenses to improve the efficiency of the candle warming lamp in directing light and/or heat towards candles. FIG. 7 illustrates an example of a candle warming lamp with a focusing lens according to one or more aspects of this disclosure. Referring to FIG. 7, a candle warming lamp 700 may include any of the features of a candle warming lamp described herein, such as a base 710, a placement region 715, a lamp shade 730 having a reflector portion 735, a support apparatus 750, a light source 740, one or more power sources 760, an outlet 765, and/or other features described herein. The candle warming lamp 700 may also include one or more focusing lenses 770. A focusing lens 770 may be positioned below the light source 740 and configured to direct light emitted by the light source 740 and/or reflected by the reflector portion 735 directly towards the placement region 715. A focusing lens 770 may have any shape, concavity, convexity, or other structural feature required to direct light towards the placement region 715. Additionally, while depicted in a position beneath the lamp shade 730 in FIG. 7, it should be understood that a focusing lens 770 may be positioned anywhere within or outside of the lamp shade 730 such that the focusing lens 770 is capable of directing at least a portion of the light emitted by the light source 740 towards the placement region 715. The focusing lens 770 may be attached to the candle warming lamp 700 with supporting links, struts, bolts, and/or by any other means. The focusing lens 770 may be attached to any portion of the candle warming lamp 700 (e.g., to the lamp shade 730, to the support apparatus 750, to the base 710, and/or to any other portion of the candle warming lamp 700). Although a single focusing lens 770 is shown in FIG. 7, it should be understood that one or more additional focusing lenses 770 may be used without departing from the scope of this disclosure. A focusing lens 770 may be constructed of any material capable of intercepting, redirecting, reflecting, refracting, and/or otherwise directing the light emitted by the light source 740 towards the placement region 715.

The use of a focusing lens 770 may further improve the efficiency of the candle warming lamp 700 in heating candles positioned within the placement region 715. For example, by directing light emitted by the 740 towards the placement region 715, the focusing lens 770 reduces the amount of light (and resulting heat) wasted by being directed towards other portions of the base 710 or otherwise being directed away from the placement region 715 and any candles positioned at the placement region 715.

Accordingly, portable apparatuses and systems that reduce an amount of electrical power needed to cause a candle to emit a scent based on using reflected light are described herein. For example, the candle warming lamp may include a lamp shade having a reflector or reflector portion made of a reflective material. The reflector may reflect light emitted by a light source and cause, based on the reflected light, a candle to emit a scent. The use of the reflector may reduce the amount of electrical energy/power that must be provided from power sources to the light source prior to the candle beginning to emit a scent. For example, by increasing the efficiency of the light emitted by the light source in reaching the candle, the candle warming lamp may increase the amount of emitted light that contacts the candle at any given moment in time and therefore increases the speed with which the candle is heated to a point where it emits the scent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A candle warming lamp comprising:

a base having a candle location configured to receive at least one candle;

a light source;

a power source electrically coupled to the light source; and a lamp shade positioned around the light source, wherein the lamp shade comprises:

a first portion at least partially enclosing the light source, the first portion having an interior facing surface; and a second portion having an interior facing surface, the second portion located below the first portion and having an angle of inclination equal to an angle of inclination of the first portion, wherein the interior of the second portion has a reflective property higher than that of the interior of the first portion to reflect light emitted by the light source, and wherein light omitted from the light source is directed by the interior of the second portion towards the candle location to aid in emitting a scent from the at least one candle.

2. The candle warming lamp of claim 1, wherein the second portion is configured to reduce, based on reflecting the light, an amount of power the power source produces prior to a candle emitting a scent.

3. The candle warming lamp of claim 1, further comprising:

an extendable support apparatus, wherein the extendable support apparatus is coupled to the light source and to the base.

4. The candle warming lamp of claim 3, wherein the extendable support apparatus is configured to modify an amount of power the power source produces prior to a candle emitting a scent by switching between a first position and a second position.

5. The candle warming lamp of claim 1, wherein the second portion is coupled to the first portion and extends, from the first portion, in a downward direction towards the base.

6. The candle warming lamp of claim 1, wherein the second portion comprises a portion of an interior surface of the lamp shade.

7. The candle warming lamp of claim 6, wherein the second portion comprises at least 90% of the interior surface of the lamp shade.

8. The candle warming lamp of claim 6, wherein the second portion comprises less than 50% of the interior surface of the lamp shade.

9. The candle warming lamp of claim 1, wherein the light source comprises at least one light emitting diode.

10. The candle warming lamp of claim 1, wherein the light source comprises a lightbulb.

11. The candle warming lamp of claim 1, further comprising:

a charging port electrically coupled to the power source; and a control mechanism configured to modify one or more settings of the candle warming lamp.

12. The candle warming lamp of claim 1, wherein the reflective property is provided by a reflective material that comprises a mirror.

13. The candle warming lamp of claim 1, wherein the reflective property is provided by a reflective material that comprises glass creating a prism-like effect in response to the light emitted by the light source contacting the reflective material.

14. The candle warming lamp of claim 1, wherein the reflective property is provided by a reflective material that comprises a coating applied over the second portion, the coating comprising one or more of:

gold;

silver;

aluminum; or copper.

15. A system for warming a candle, the system comprising:

a light source;

a shade positioned around the light source, wherein the shade comprises:

a first portion at least partially enclosing the light source; and a second portion having an interior facing surface, the interior facing surface of the second portion having a reflective property that meets or exceeds a threshold amount of reflectivity to direct the light emitted by the light source towards the center of a base having a candle location configured to receive at least one candle, wherein the threshold amount of reflectivity is at least ninety percent;

a support apparatus coupled to the light source and to the shade, the support apparatus configured to maintain the shade a threshold distance above the base; and a control mechanism configured to modify an intensity of light emitted by the light source.

16. The system of claim 15, wherein the support apparatus comprises an extendable portion configured to modify an intensity of light received by the center of the base.

17. The system of claim 15, wherein the interior of the second portion comprises one or more of:

an alloyed coating;

a metal; or a glass.

18. The system of claim 15, wherein the control mechanism comprises:

a dial configured to be positioned between two or more settings, wherein the control mechanism is coupled to the light source via the support apparatus.

19. The system of claim 15, wherein the control mechanism comprises a remote control mechanism.

20. A candle warming lamp comprising:

a base having a candle location configured to receive at least one candle; and a lamp shade positioned above a light source and having a truncated conical body, wherein the truncated conical body comprises:

an upper portion at least partially enclosing the light source, the upper portion having an interior facing surface; and a lower portion having an interior facing surface, the lower portion located below the upper portion, wherein the interior of the lower portion has a reflective property higher than that of the interior of the upper portion to reflect light emitted by the light source, and wherein light omitted from the light source is directed by the interior of the lower portion towards the candle location to aid in emitting a scent from the at least one candle.

* * * * *